(12) United States Patent
Patel et al.

(10) Patent No.: US 6,970,280 B2
(45) Date of Patent: Nov. 29, 2005

(54) HIGH ANGLE MICRO-MIRRORS AND PROCESSES

(75) Inventors: Satyadev R. Patel, Elk Grove, CA (US); Andrew G. Huibers, Palo Alto, CA (US); Peter J. Heureux, Felton, CA (US)

(73) Assignee: Reflectivity, INC, Sunnyvale, CA (US)

( * ) Notice: Subject to any disclaimer, the term of this patent is extended or adjusted under 35 U.S.C. 154(b) by 0 days.

(21) Appl. No.: 10/990,835

(22) Filed: Nov. 16, 2004

(65) Prior Publication Data

US 2005/0078349 A1   Apr. 14, 2005

Related U.S. Application Data

(63) Continuation of application No. 10/366,296, filed on Feb. 12, 2003, now Pat. No. 6,885,494.

(51) Int. Cl.[7] .................. G02B 26/00; G02B 26/08; G02F 1/00
(52) U.S. Cl. .................. 359/290; 359/225; 348/771
(58) Field of Search .................. 359/223, 224, 359/230, 290, 291, 295, 298, 318, 855, 225; 348/770, 771; 310/36

(56) References Cited

U.S. PATENT DOCUMENTS

| | | | |
|---|---|---|---|
| 5,293,511 A | 3/1994 | Poradish et al. | 257/434 |
| 5,535,047 A | 7/1996 | Hornbeck | 359/295 |
| 5,579,151 A | 11/1996 | Cho | 359/291 |
| 5,592,188 A | 1/1997 | Doherty et al. | 345/84 |
| 5,610,438 A | 3/1997 | Wallace et al. | 257/682 |
| 5,717,513 A | 2/1998 | Weaver | 359/221 |
| 5,771,116 A | 6/1998 | Miller et al. | 359/295 |
| 5,835,256 A | 11/1998 | Huibers | 359/291 |
| 5,841,579 A | 11/1998 | Bloom et al. | 359/572 |
| 5,886,811 A | 3/1999 | Min | 359/291 |
| 5,937,271 A | 8/1999 | Min | 438/30 |
| 5,982,553 A | 11/1999 | Bloom et al. | 359/627 |
| 5,991,079 A | 11/1999 | Furlani et al. | 359/573 |
| 5,999,306 A | 12/1999 | Atobe et al. | 359/295 |
| 6,004,912 A | 12/1999 | Gudeman | 508/577 |
| 6,014,257 A | 1/2000 | Furlani et al. | 359/573 |
| 6,031,652 A | 2/2000 | Furlani et al. | 359/224 |
| 6,046,840 A | 4/2000 | Huibers | 359/291 |
| 6,088,102 A | 7/2000 | Manhart | 356/499 |
| 6,101,036 A | 8/2000 | Bloom | 359/567 |
| 6,130,770 A | 10/2000 | Bloom | 359/224 |

(Continued)

FOREIGN PATENT DOCUMENTS

| WO | WO 2004/000720 | 12/2003 |
|---|---|---|
| WO | WO 2004/001487 | 12/2003 |
| WO | WO 2004/001717 | 12/2003 |

Primary Examiner—Georgia Epps
Assistant Examiner—William Choi
(74) Attorney, Agent, or Firm—Gregory R. Muir (57) ABSTRACT

A micro-mirror that comprises a substrate, a hinge structure formed on the substrate and a mirror plate attached to the hinge structure is provided for use in display systems. The mirror plate is capable of rotating from a non-deflected resting state to a state that is at least 14° degrees. In operation, the micro-mirror switches between an "ON"-state and "OFF"-state, which are defined in accordance with a rotational position of the mirror plate. The OFF state can be a non-deflected position of the micro-mirror (generally parallel to the substrate), the same angle (though opposite direction) as the ON state, or an angle less than the ON state (though in the opposite direction). Reflected light from the "ON" and "OFF" states are thus separated and the contrast ratio is improved.

37 Claims, 10 Drawing Sheets

U.S. PATENT DOCUMENTS

| | | |
|---|---|---|
| 6,396,619 B1 | 5/2002 | Huibers et al. ............. 359/291 |
| 6,523,961 B2 | 2/2003 | Ilkov et al. ................... 353/99 |
| 2002/0171778 A1 | 11/2002 | Hubby, Jr. ................. 348/760 |
| 2003/0234994 A1 | 12/2003 | Pan ............................ 359/871 |
| 2004/0004753 A1 | 1/2004 | Pan ............................ 359/263 |
| 2004/0036947 A1 | 2/2004 | Inoue et al. ................ 359/291 |
| 2004/0036948 A1 | 2/2004 | Inoue et al. ................ 359/291 |
| 2004/0069742 A1 | 4/2004 | Pan ............................. 216/24 |
| 2004/0125346 A1 | 7/2004 | Huibers ...................... 353/98 |
| 2004/0145795 A1 | 7/2004 | Pan et al. ................... 359/291 |
| 2004/0145822 A1 | 7/2004 | Pan et al. ................... 359/872 |
| 2004/0156089 A1 | 8/2004 | Doan et al. ................. 359/291 |
| 2004/0159631 A1 | 8/2004 | Pan et al. ..................... 216/24 |

FIG. 2b non-deflected resting state

"OFF"-state

FIG. 2c

"OFF"-state

FIG. 2d

"ON"-state

HIGH ANGLE MICRO-MIRRORS AND PROCESSES

CROSS-REFERENCE TO RELATED APPLICATIONS

This application is a continuation of U.S. patent application Ser. No. 10/366,296 to Patel filed Feb. 12, 2003, now U.S. Pat. No. 6,885,494, the subject matter being incorporated herein by reference.

TECHNICAL FIELD OF THE INVENTION

The present invention is related generally to micro-mirrors, and, more particularly, to micro-mirrors for use in display systems.

BACKGROUND OF THE INVENTION

The present invention relates to reflective micro-mirrors and micro-mirror arrays for, e.g., projection-type displays, for steering light beams, maskless lithography, maskless micro-array production, etc. A common feature is a micro-mirror that is movable so as to deflect incident light. In one type of conventional direct view or projection-type display system, an array of reflective micro-mirrors is provided for producing an image. Typically the micro-mirrors have a either a tilt angle for the "ON" state and a non-deflected resting state for the "OFF" state, as shown in FIG. 1, or the same tilt angles for "ON" and "OFF" states but opposite sign (not shown).

Figure 1:
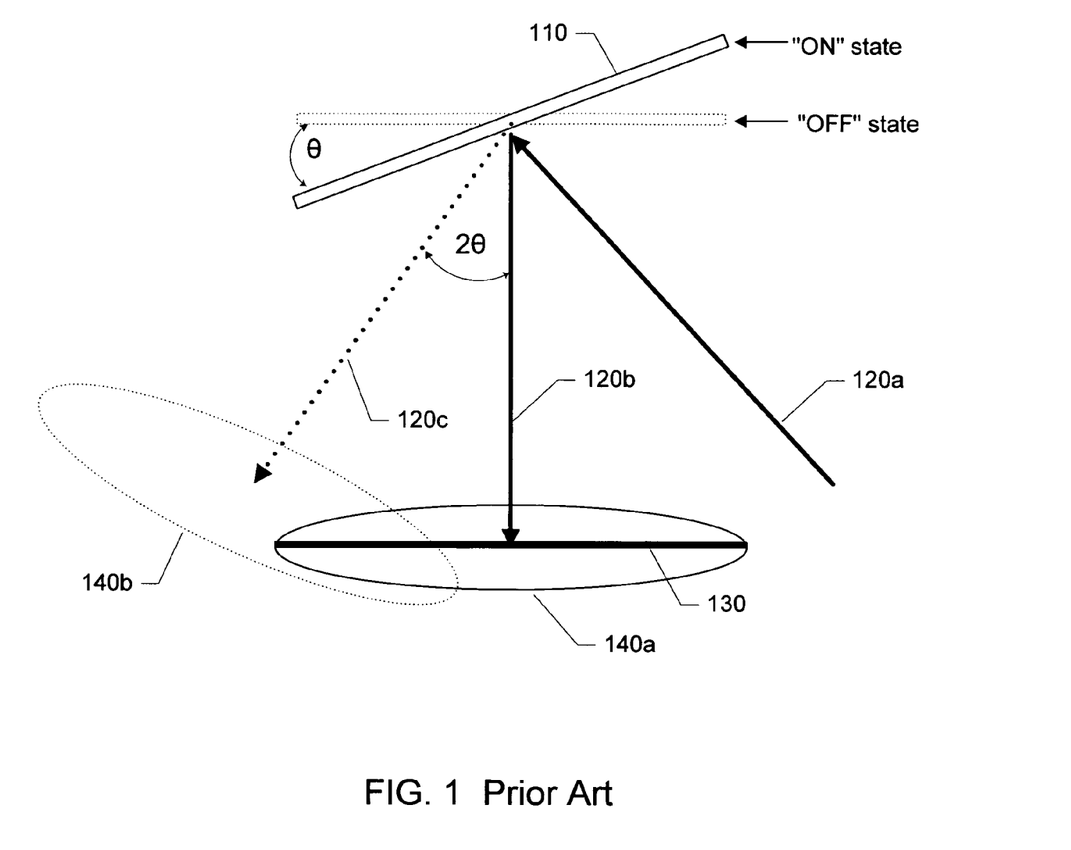
FIG. 1 is a schematic diagram demonstrating a reflective micro-mirror reflecting an incident light at different tilted angles.

Referring to FIG. 1, micro-mirror 110 operates at binary states—"ON" and "OFF" states. The "OFF" state is defined as micro-mirror 110 being placed horizontally. And the "ON" state is defined as micro-mirror 110 being rotated at an angle θ from the "OFF" state. In operation, micro-mirror 110 switches between the "ON" and "OFF" states, thus selectively reflecting light into or away from target 130 (e.g. a screen or a viewer's eyes).

As an exemplary application for displaying an image, micro-mirror 110 is associated with a pixel of an image. At a time when the pixel is "bright", micro-mirror 110 is set to the "ON" state. Incident light 120a is reflected as light 120b, generating an image profile 140a of micro-mirror 110 on target 130. At another time when the pixel turns to "dark", micro-mirror 110 is set to the "OFF" state. Incident light 120a is reflected away from target 130, resulting in an image profile 140b in a different location other than the target 130.

When the tilt angle θ is small, the two image profiles 140a and 140b may be overlapped as shown. Target 130 collects reflected light from both "ON" and "OFF" states. When target 130 is a pixel of a displayed image, the contrast ratio of the pixel, thus the quality of the displayed image is reduced. Contrast ratio is the ratio of luminance between the brightest white that can be produced and the darkest black that can be produced. And it is a major determinant of perceived image quality. If a displayed image has high contrast ratio, a viewer will judge it to be sharper than a displayed image with lower contrast ratio, even if the lower contrast image has substantially more measurable resolution. The degradation of the contrast ratio becomes larger as the angular extent of the incident beam grows.

Therefore, a micro-mirror with high contrast ratio is desired.

SUMMARY OF THE INVENTION

In view of the forgoing, the present invention provides a micro-mirror for use in display systems, which is rotatable relative to the substrate by the hinge structure from an OFF state to an ON state that is at least 14° (fourteen degrees) from a non-deflected resting state of the micro-mirror. Furthermore, the mirror plate is rotatable relative to the substrate by the hinge structure from a non-deflected resting state to a state that is in a preferred range of from 15 to 27 degrees, or from 17.5 to 22.5 degrees, from the non-deflected resting state. A state of around 20 degrees can be particularly desirable.

In an embodiment of the invention, the mirror plate attached to the hinge that is formed on the substrate is rotatable relative to the substrate by a hinge structure from the non-deflected resting state to a second state that is at least 14° (fourteen degrees) or more from the non-deflected resting state.

In another embodiment of the invention, the micro-mirror operates in a binary-mode, including an "ON"-state and "OFF"-state. The "ON"-state is defined in accordance with a first rotational position of the mirror plate held on the substrate, wherein the first rotational position is at least 14° (fourteen degrees) from a non-deflected resting state of the mirror plate. And the "OFF"-state is defined in accordance with a second rotational position of the mirror plate held on the substrate. The "OFF"-state can be a state when the mirror plate is in a non-deflected position parallel to the substrate. Alternatively, the "OFF"-state can be a state when the mirror plate is rotated in the opposite direction of at least 14° (fourteen degrees) from the non-deflected resting state (e.g. this can be the same degree of rotation as in the ON state). Or, as will be mentioned below, the OFF state can be a deflected in the opposite direction from the ON state to a position that is at an angle less than the angle of the ON state. In operation, the mirror plate switches between the "ON"-state and "OFF"-state, turning the pixel associated with the micro-mirror on and off.

In yet another embodiment of the invention, a number of micro-mirrors forms a micro-mirror array for use in a display system. A typical number of the micro-mirrors in an array is 100,000 or more. Each mirror is associated with a pixel of an image displayed by the display system. In operation, the micro-mirror operates in a binary-mode, including an "ON"-state and "OFF"-state. The "ON"-state is defined in accordance with a first rotational position of the mirror plate held on the substrate, wherein the first rotational position is at least 14° (fourteen degrees) from a non-deflected resting state of the mirror plate. And the "OFF"-state is defined in accordance with a second rotational position of the mirror plate held on the substrate. The "OFF"-state can be a state when the mirror plate is parallel to the substrate. Alternatively, the "OFF"-state can be a state when the mirror plate is opposite direction of at least 14° (fourteen degrees) from the non-deflected resting state. In operation, the mirror plate switches between the "ON"-state and "OFF"-state, turning the pixel associated with the micro-mirror on and off.

In yet another embodiment of the invention, the micro-mirror is implemented in a display system for displaying an image. The display system comprises a light source, a set of optical devices and a number of micro-mirrors, each of which is associated one of a plurality of pixels of the image. The micro-mirror further includes a substrate, a hinge formed on the substrate and a mirror plate attached to the hinge such that the mirror plate is rotatable relative to the substrate by the hinge. Each micro-mirror operates in a binary-mode, including an "ON"-state and "OFF"-state. The "ON"-state is defined in accordance with a first rotational position of the mirror plate held on the substrate, wherein the first rotational position is at least 14° (fourteen degrees) from a non-deflected resting state of the mirror plate. And the "OFF"-state is defined in accordance with a second rotational position of the mirror plate held on the substrate. The "OFF"-state can be a state when the mirror plate is parallel to the substrate. Alternatively, the "OFF"-state can be a state when the mirror plate is opposite direction of at least 14° (fourteen degrees) from the non-deflected resting state. In operation, the light source shines on the mirror plates. The micro-mirrors associated with the "dark"-pixels in the image are set to the "OFF"-state such that these micro-mirrors reflect the incident light from the light source away from the display target. And the micro-mirrors associated with the "bright"-pixels in the image are set to the "ON"-state such that these micro-mirrors reflect the incident light from the light source into the set of optics, thereby generating the image on the display target.

In yet another embodiment of the invention, a method of formation of the micro-mirror measured in microns for use in display systems is disclosed. According to the embodiment, the micro-mirror is formed on a substrate. Before forming a mirror plate layer, a first sacrificial layer is deposited on the substrate. Formation of the mirror plate layer may further comprise depositing a light reflective metallic material on the first sacrificial layer followed by pattering the deposited metallic layer. After the forming the mirror plate layer, a second sacrificial layer is deposited. Then a hinge structure is built on the second sacrificial layer. In order to release the mirror plate and the hinge structure, the two sacrificial layers are removed by proper etchants.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 2b is a cross-sectional view of an exemplary micro-mirror array used in the display system shown in FIG. 2a;

DETAILED DESCRIPTION OF THE INVENTION

Figure 2A:
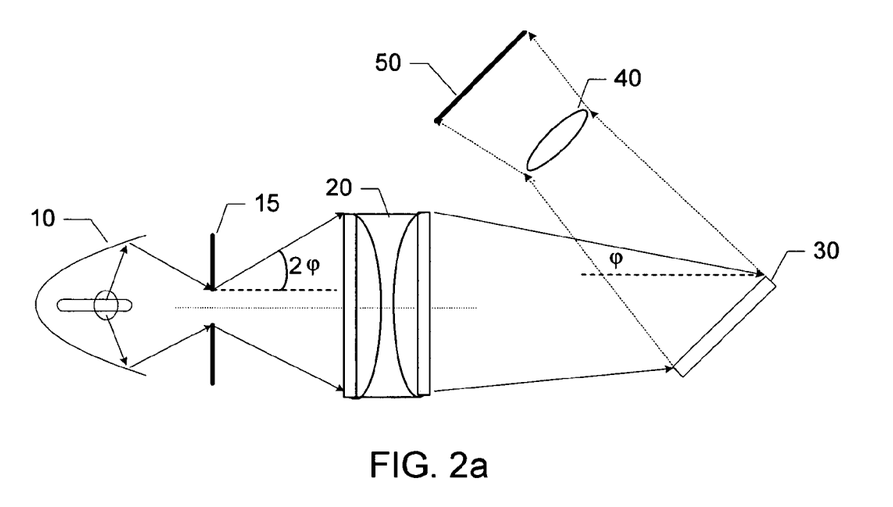
FIG. 2a is an exemplary environment in which embodiments of the present invention may be operated.
Figure 2B:
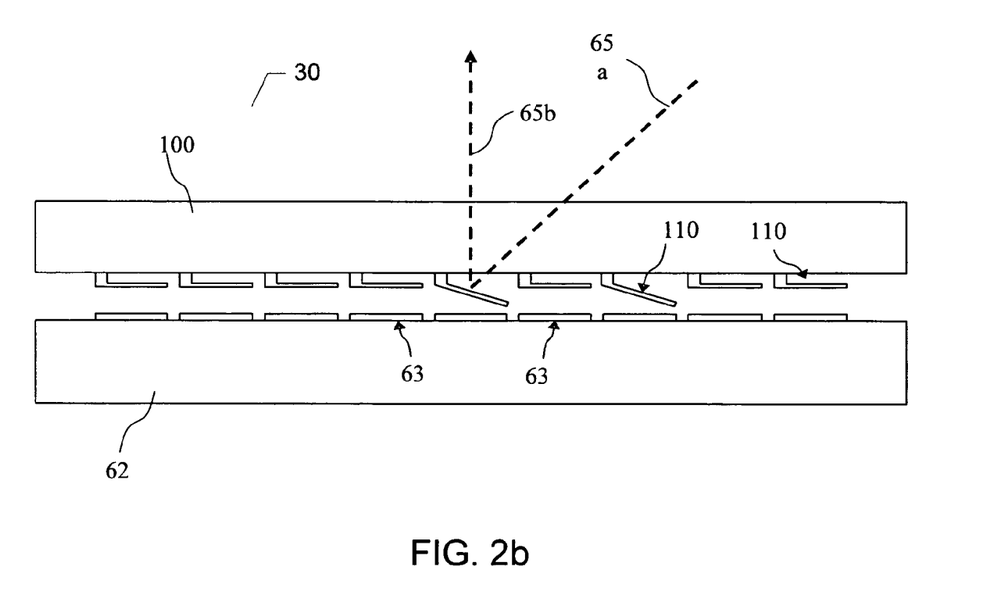

The present invention provides a micro-mirror for use in display systems. A typical display system employing a micro-mirror device is schematically illustrated in FIG. 2a. In its very basic configuration, the display system comprises a light source 10, aperture 15, optics 20 and 40 (e.g. a single lens or series of lenses), display target 50 and micro-mirror device 30. Micro-mirror device 30 is preferably an array of micro-mirrors (preferably numbering in the thousands or at least a million mirrors and having dimensions on the order of 25 microns or less) with a preferred fill factor of at least 90% (ratio of reflective surface mirror surface to total area) that is controlled by a controller (e.g. as disclosed in U.S. Pat. No. 6,388,661 issued May 14, 2002 incorporated herein by reference). Light source 10 (e.g. an arc lamp) directs light through aperture 15 and optical device 20 (e.g. an object lens) and shines on micro-mirror device 30. The light after the aperture is angularly distributed over $4\phi=2\cdot2\phi$ before optics 20, and the light after optics 20 opens a solid angle 2 $\phi$ towards micro-mirror device 30. Micro-mirror device 30 comprises an array of thousands or millions of micro-mirrors that selectively reflect the incident light toward optical element 40 (e.g. projection lens), resulting in an image on display target 50. The micro-mirror device may have a variety of configurations. FIG. 2b presents an exemplary micro-mirror device according to an embodiment of the invention.

Referring to FIG. 2b, a cross-sectional view of micro-device 30 in FIG. 2a is illustrated therein. A plurality of micro-mirrors 110 are formed on substrate 100, which is transparent to at least visible light. A typical size of the micro-mirror is on the order of a few microns or larger. A multiplicity of electrodes 63 are disposed and associated with the micro-mirrors for electro-statically deflecting the micro-mirrors. For simplicity and demonstration purposes, micro-mirrors and electrodes are shown in diagrammatical sketches and only 9 micro-mirrors and electrodes are illustrated therein for convenience. An incoming light beam 65a is reflected by a non-deflected mirror at the same angle as it is incident, but will be deflected "vertically" as outgoing light beam 65b when the mirror is deflected (though the reflected light in the ON state need not to be perpendicular to the plane corresponding to the mirror in the OFF state). The outgoing light beam 65b is then collected by the projection lens (e.g. optical element 40 in FIG. 2a) for generating an image.

The quality of the generated image can be determined by many facts. Contrast ratio is a major determinant of perceived image quality. If a displayed image has high contrast ratio, a viewer will judge it to be sharper than a displayed image with lower contrast ratio, even if the lower contrast image has substantially more measurable resolution. Contrast ratio of the displayed image can be seriously degraded by reflected light from non-deflected micro-mirrors. For example, when the micro-mirrors can only be deflected at a small angle, the angle between the incident light (e.g. 65a) and the "vertical" direction (65b), along which the projection lens is disposed, is small. And the angle between the "vertical" direction and the reflected light from the non-deflected micro-mirrors is also small. As a consequence, part of the reflected light from the non-deflected micro-mirrors may travel through the projection lens of the display device and mixes with the reflected light from the deflected micro-mirrors. This situation becomes even worse when the incident light has finite size and opens a solid angle toward the micro-mirrors. To solve this problem, the present invention provides a micro-mirror that can be deflected at large angles such that the reflected light from the non-deflected and deflected states are safely separated. An exemplary micro-mirror according to an embodiment of the invention is illustrated in FIGS. 2c to 2e.

Figures 2C, 2D:
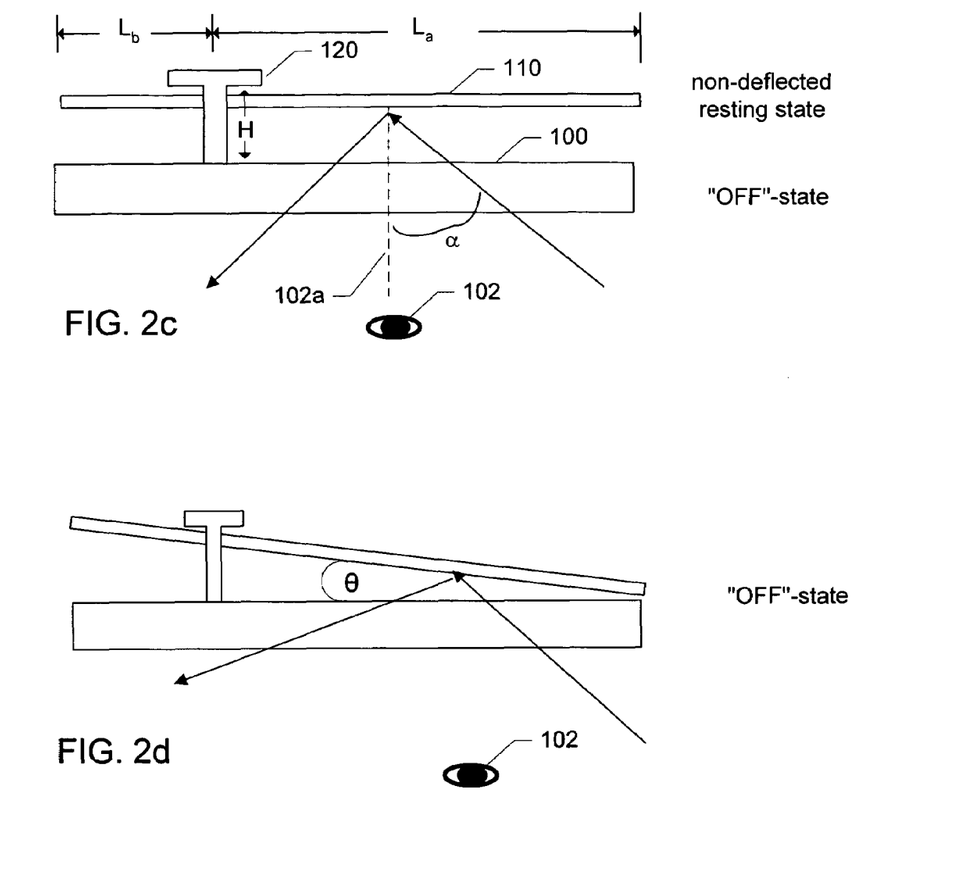
FIGS. 2c, 2d and 2e illustrate an exemplary micro-mirror with an asymmetric configuration according to an embodiment of the invention.

Referring to FIG. 2c, the basic configuration of the micro-mirror comprises substrate 100, hinge posts 120, a hinge that is hide under the posts and mirror plate 110. Substrate 100 can be a light transmissive substrate such as glass, quartz or sapphire. Hinge 120 is formed as being held on the substrate via hinge posts 120. Mirror plate 110 is attached to the hinge such that the mirror plate extends a greater distance from the hinge on one side of the hinge than on the other side of the hinge. For example, the distance $L_b$ measured from the left end of mirror plate 110 to the hinge is less than the distance $L_a$ measured from the right end of the mirror plate to the hinge. This asymmetric configuration enables the mirror plate rotating relative to the substrate by the hinge at much larger angles. Reflected light from different operational states that are defined in accordance with rotational positions (angles) of the mirror plate can thus be well separated. In this way, the contrast ratio of a displayed image by the micro-mirror is greatly improved.

In operation, multiple operation states are defined for the micro-mirror in accordance with rotational status of the mirror-plate and the relative position of the target (e.g. a screen or a viewer's eyes). For example, a non-deflected resting state can be defined when the mirror plate is placed in parallel to the substrate as shown in FIG. 2c. In an embodiment of the invention, an "OFF" state is defined as the non-deflected resting state. By this definition, when the micro-mirror is in the "OFF" state the incident light is reflected away from target 102. Thus, target 102 is not able to collect reflected light and "see" the micro-mirror. In another embodiment of the invention, the "OFF" state is defined as the longer portion (e.g. $L_a$) of the mirror plate being rotated toward the substrate and making an angle (represented by θ) with the substrate as shown in FIG. 2d. Typical values of angle θ are 1° (one degree) or more and 14° (fourteen degrees) or more (these deflection angles being in opposite directions as shown). In one embodiment, the OFF angle is from 0.5 to 7 degrees, preferably from 1 to 9 or 1 to 4 degrees, (at least 2 degrees is preferred in many cases) whereas the ON angle is preferably from 15 to 27 degrees. With this definition, more of the light reflected from the "OFF" state of the micro-mirror is directed away from target 102. Corresponding to either "OFF" state, an "ON" state may be defined in accordance with a rational position of the mirror plate.

Figure 2E:
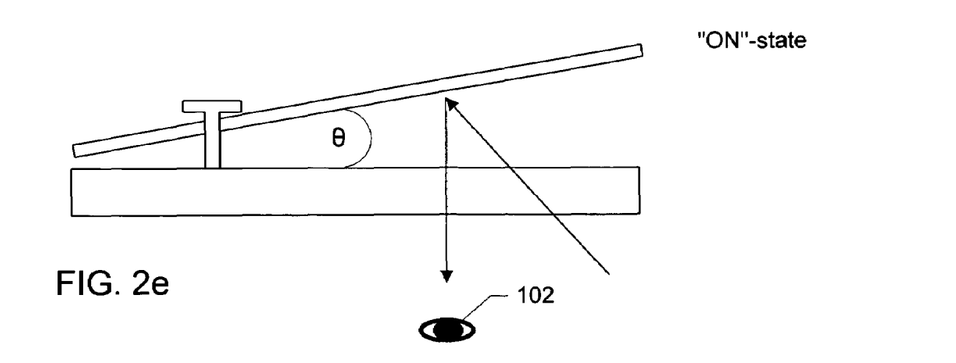

In an aspect of the embodiment of the invention, an "ON" state is defined as the shorter portion (e.g. $L_b$) of the mirror plate being rotated toward the substrate and making an angle θ with the substrate as shown in FIG. 2e. The maximum value of θ can be approximated as: $θ≈\sin^{-1}(H/L_b)$, wherein H being the height of the hinge on the hinge posts relative to the substrate. The expression implies that θ increases with decreasing $L_b$, given that the height (H) of the hinge is fixed. For example, by adjusting $L_b$, 14° (fourteen degrees) or more, and preferably from 15° (fifteen degrees) to 27° (twenty seven degrees)—with improved performance achieved at from 17.5° (seventeen and a half degrees) to 22.5° (twenty two and a half degrees), with best performance at around 20° (twenty degrees), a higher contrast ratio can be achieved. In addition, the incident light angle α (e.g. the angle between the incident light direction and normal direction 102a of micro-mirror 110) is preferably 28° or more. And the incident light angle can also be 30° or more, or even 36° or more. With the definition of the "ON" state as the angle θ as set forth above, the mirror plate reflects incident light onto target 102 and enables the target to "receive" light from the micro-mirror, with decreased light incident on the target from the "OFF" state.

As discussed above, a large angle difference between the "ON" and "OFF" states improves the contrast ratio. However, a large angle difference may decrease collected lumens by the micro-mirror, thus degrading the brightness, as well as the contrast ratio, of displayed image. This degradation arises from the fact that, in most applications, incident light has finite angular distribution. Referring back to FIG. 2a, the incident light after aperture 15 is angularly distributed over 4ϕ. The angular distribution is reduced to 2 ϕ when the incident light impinges micro-mirror device 30. The collected lumens by a micro-mirror of the micro-mirror device monotonically increase with the gap of aperture 15 increasing. On the other hand, the angular distribution of light impinging the micro-mirror plate also increases with the increasing of the aperture gap because the aperture-to-micro-mirror plate magnification must also be changed. As a consequence, the rotation angle corresponding to the "ON" state is increased. That is, the "ON" state angle necessary for separating the profiles of the "ON" and "OFF" states (e.g. 140a and 140b in FIG. 1) is increased. In sum, the increasing of the aperture gap, on one hand, increases the collected lumens by the micro-mirror, and on the other hand, increases the "ON" state angle necessary for separating the profiles of the "ON" and "OFF" states. The variation of the collected lumens by the micro-mirror to the "ON" state angle is presented by the solid circles in FIG. 2g. As can be seen in this figure, the collected lumens (in arbitrary units) monotonically increases with the "ON"-state angle increasing. This monotonic variation, however, needs to be modified in most real applications. The ON and OFF states can be reached by the mirror plate impacting the substrate and/or by impacting a stopping mechanism (e.g. a protrusion off of the post holding the mirror plate on the substrate).

Figure 2F:
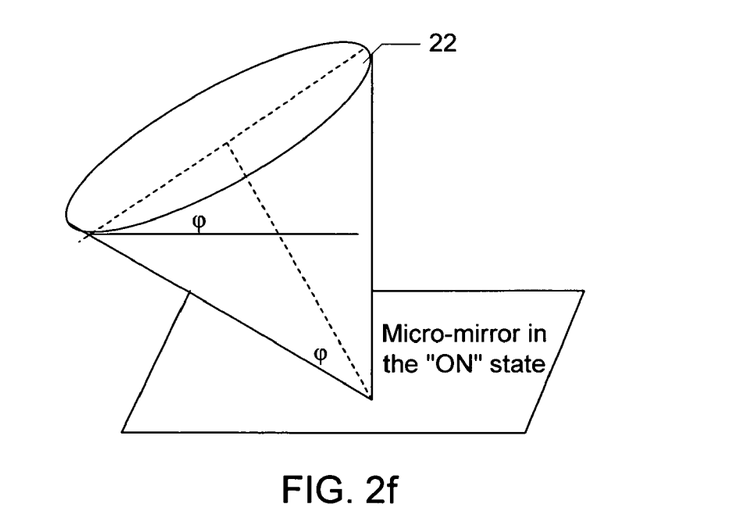
FIG. 2f schematically illustrates a beam of light, which opens a solid angle towards a micro-mirror, shines on the micro-mirror.
Figure 2G:
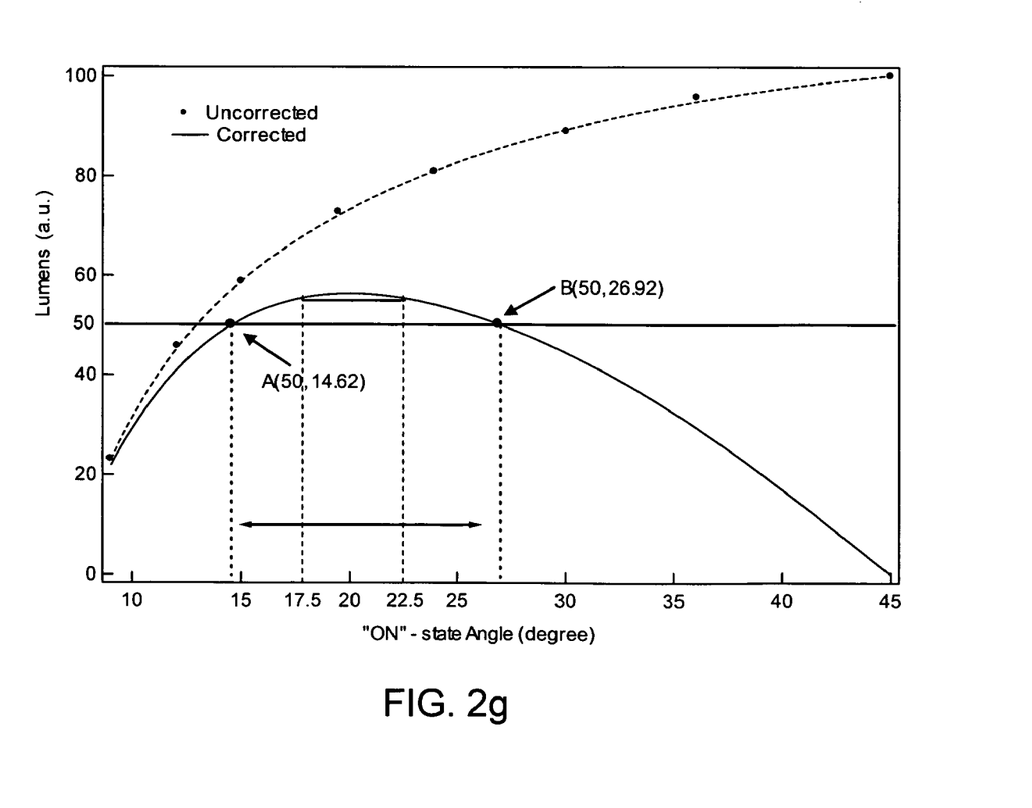
FIG. 2g diagrammatically presents the collected lumens by the micro-mirror before and after a correction of the solid angle in FIG. 2f.

Referring to FIG. 2f, in most real applications, the incident light shines on the surface of a micro-mirror of the micro-mirror device at a certain angle (e.g. the incident angle 2θ shown in FIG. 1). The collected lumens of the micro-mirror are determined by the projection angle and size of lumens profile 22 onto the micro-mirror that is in the "ON" state. Projected light varies with the "ON" state angle according to a cosinusoidal law. As shown in FIG. 2g, the collected lumens after correction first increases with the "ON" state increasing as more light is collected from the lamp through the lamp collection aperture, and then decreases after an optimum "ON" state angle (around 20 degrees) due to the cosinusoidal projection effect. Given this fact, it is desired that the "ON" state angle is selected such that, not only the separation of the "ON" and "OFF" states is achieved, but also proper collected lumens by the micro-mirror is achieved. In an embodiment of the invention, the "ON" state angle is preferably selected from an angle range defined by a lower angle limit and upper limit. For example, as shown in FIG. 2g, the "ON" state angle components of the A and B points in the curve of the corrected lumens respectively define the lower (e.g. 14.62 degrees) and upper limits (26.92 degrees) of the preferred "ON" state angle in real applications, wherein the lumens components of both points are 50% of the highest lumens. Thus in the present invention, the ON state angle is at least 14 degrees, and preferably 15 to 27 degrees. A range of from 17.5° (seventeen and a half degrees) to 22.5° (twenty two and a half degrees) is particularly desirable. Accordingly, any "ON" state angle selected within this desired range, on one hand, guarantees the collected lumens by the micro-mirror of at least greater than 50% of the highest collected lumens possible, and on the other hand, ensures that the "ON" and "OFF" states can be properly separated from each other.

In operation, the micro-mirror switches between the "ON" and "OFF" states and selectively direct reflected light into or away from the target. As an example, the "OFF" state is defined as the mirror plate being rotated in one direction with the larger portion of the mirror plate making an angle of, for example, from 1° to 4° (one to four degrees) with the substrate. An OFF state of from 2 to 9 degrees can be desirable. The "ON" state is defined as the mirror plate being rotated in the opposite direction with the shorter portion of the mirror plate making an angle of at least 14° (fourteen degrees) with the substrate. With this definition, the "ON" and "OFF" states are well separated. Consequently, separation of reflected light from the "ON" and "OFF" states is highly secured. It is also possible to make the OFF state of the same magnitude (but opposite rotation) as the ON state.

Figure 3:
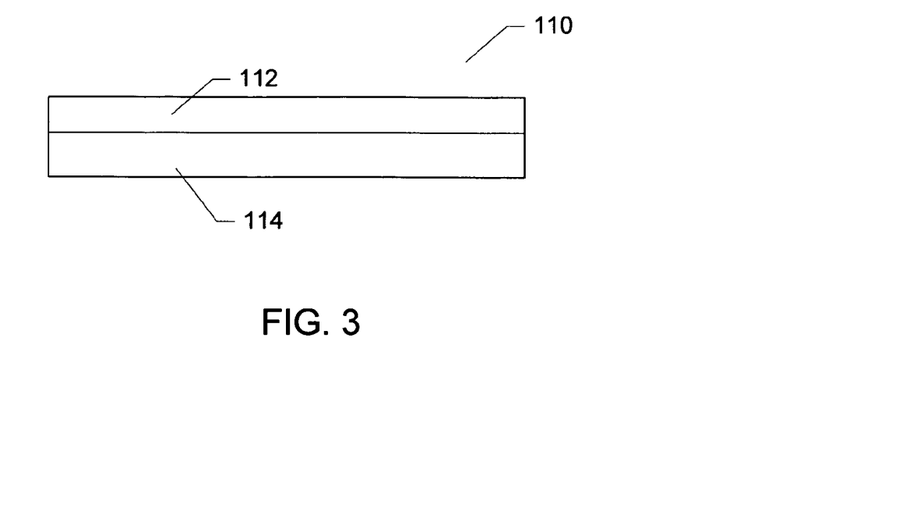
FIG. 3 is a cross-sectional view of an exemplary micro-mirror plate according to an embodiment of the invention.

Referring to FIG. 3, an exemplary mirror plate (e.g. mirror plate 110 in FIG. 2b) is illustrated therein. In an aspect of the embodiment of the invention, the mirror plate is a multilayer structure. For example, layer 114 is light reflective layer. To guarantee a high reflectivity to at least visible light, light reflective layer 114 is preferably made of metallic materials or metallic alloys. Given that the mirror plate rotates frequently during operation, a mechanical enhancing layer 112 can be further deposited on the light reflective layer 114, wherein the mechanical enhancing layer 112 preferably has a higher strength than the light reflective layer 114.

The mirror plate is attached to and rotatable relative to the substrate by a hinge structure that includes support structure such as one or more posts attached to the substrate, and a hinge such as a flexure or torsion hinge that allows the mirror plate to rotate. The hinge structure can have different forms, which will be discussed in detail in the following with reference to FIGS. 4 to 10.

Figure 4:
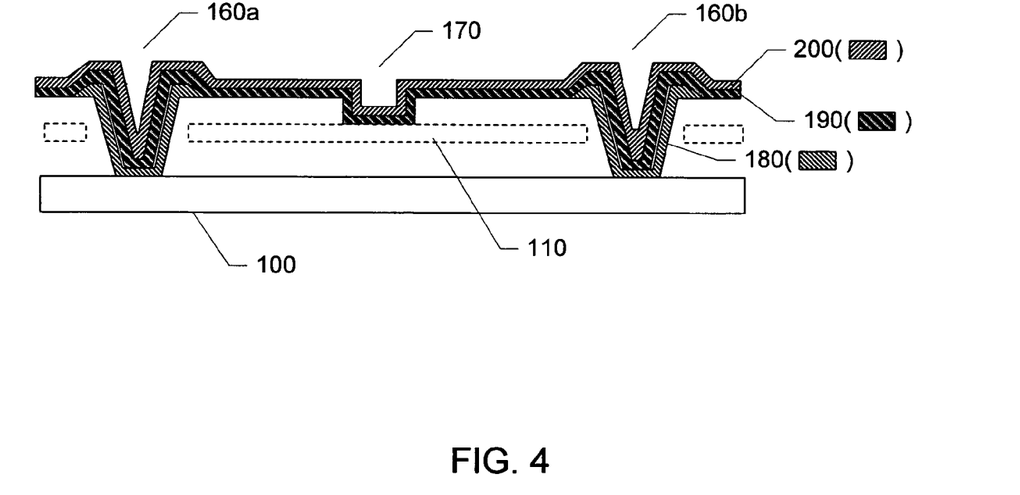
FIG. 4 is a cross-sectional view of an exemplary hinge structure of a micro-mirror in accordance with an embodiment of the invention.

Referring to FIG. 4, a cross-sectional view of an exemplary hinge structure according to an embodiment of the invention is illustrated therein. The hinge structure can comprise a single or multiple layers, such as layers 180, 190 and 200. It is preferred that layer 180 comprises materials having higher strengths, such as standard PECVD SiN$_x$. It is further preferred that materials of layer 180 have large elastic modulus. Layer 200 can be materials of low creep rate and/or high strength, such as standard PECVD SiN$_x$. And layer 190 can be of any suitable materials that have low creep rate and high strength. In addition, it is preferred that layer 190 is electrically conducting. Exemplary materials for layer 190 are Al, TiAl$_x$, Cu, TiW$_x$, AlSi$_x$Cu$_y$, TiSi$_x$N$_y$, TiN$_x$, TiW$_x$N$_y$, SiO$_x$N$_y$, TaSi$_x$N$_y$, WN$_x$, AlW$_x$, tungsten carbide, silicon carbide or titanium carbide. To improve the performance of the hinge structure, fine structures are further constructed upon the hinge structure. For example, two posts 160a and 160b are formed for efficiently supporting the hinge structure on a substrate. Moreover, each post can be constructed into a "V" shape to enhance the mechanical strength. A shallow via structure 170 is formed on the structure for holding and making an electrical contact with the mirror plate 110 (in dashed line). Though layers 180 and 200 are preferably made of the same material, this is not an absolute requirement. Instead, layer 180 and 200 can be of any suitable materials for improving the mechanical properties of the hinge structure. Additional examples include Al, TiAl$_x$, Cu, TiW$_x$, AlSi$_x$Cu$_y$, TiSi$_x$N$_y$, TiN$_x$, TiW$_x$N$_y$, SiO$_x$N$_y$, TaSi$_x$N$_y$, WN$_x$, AlW$_x$, tungsten carbide, silicon carbide or titanium carbide. Also, if the hinge is a single layer, it is preferably an electrically conductive material, such as an ion implanted ceramic, a conductive ceramic compound such as TiN, TiO, etc., or a ternary conductive compound such as disclosed in the Reid patent applications mentioned below.

Figure 5:
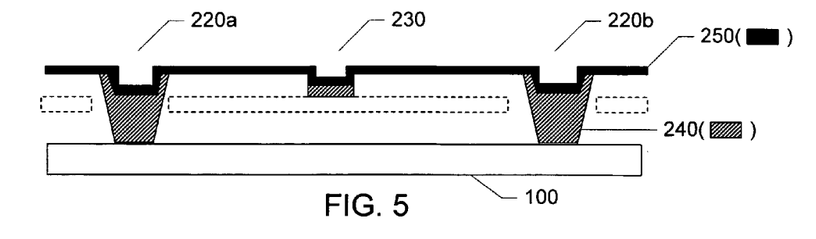
FIG. 5 is a cross-section view of an exemplary hinge structure of a micro-mirror in accordance with another embodiment of the invention.

Referring to FIG. 5, a cross-sectional view of an exemplary hinge structure according to another embodiment of the invention is illustrated therein. The hinge structure comprises multiple layers 240 and 250. Layer 250 is an electrically conducting layer for making electrical contact with the mirror plate. Layer 250 can be made of a single layer having suitable mechanical and electrical properties, such as TiN, TiSiN, TaSiN, TiWN, CoSiN, etc. Layer 240 is provided for providing a rigid contact between the hinge, mirror plate and substrate and is preferably electrically conductive. A typical material for layer 240 is CoSiN, TiSiN or tungsten.

Figure 6:
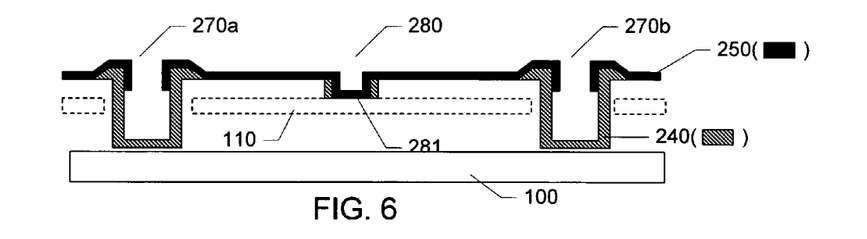
FIG. 6 is a cross-section view of an exemplary hinge structure of a micro-mirror in accordance with yet another embodiment of the invention.

Referring to FIG. 6, a cross-sectional view of an exemplary hinge structure according to yet another embodiment of the invention is illustrated therein. The hinge structure comprises multiple layers 240 and 250. Unlike that in FIG. 5, conductive layer 250 fills shallow via 280 and makes an electrical contact with mirror plate 110. The post areas (e.g. 270a and 270b) are also configured differently from that of FIG. 5. As shown in FIG. 6, layer 240 fills the sidewalls and the bottom of the post areas. This design provides a rigid connection between the mirror plate, the hinge and the substrate.

Figure 7:
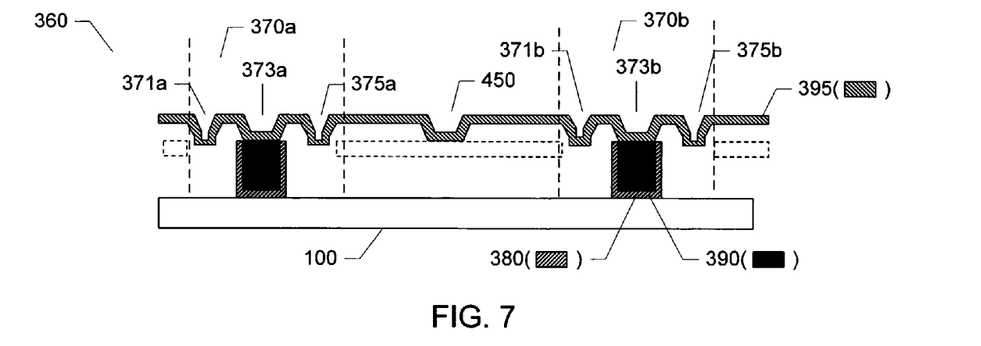
FIG. 7 is a cross-section view of an exemplary hinge structure of a micro-mirror in accordance with yet another embodiment of the invention.

Referring to FIG. 7, a cross-sectional view of an exemplary hinge structure according to yet another embodiment of the invention is illustrated therein. The hinge structure comprises multiple layers 380, 390 and 395. Layers 380 and 390 can be a metal such as tungsten or a ceramic material such as SiO$_x$N$_y$, SiN$_x$, SiO$_x$, TiN$_x$, TiSi$_x$N$_y$, etc. And layer 395 is preferably a conductive material, for example, Al, TiAl$_x$, TiW$_x$, Cu. TiSi$_x$N$_y$, CoSi$_x$N$_y$, TaSi$_x$N$_y$ or other ternary compositions. In order to improve mechanical and electric properties of the hinge structure, more fine structures are formed thereon. For example, post 370a further comprises fine structures 371a, 373a and 375a. The collective effect of these fine structures helps to, for example, release the tension resulting from the sway of shallow via 450 and the mirror plate (in dash lines) attached thereto.

Figure 8:
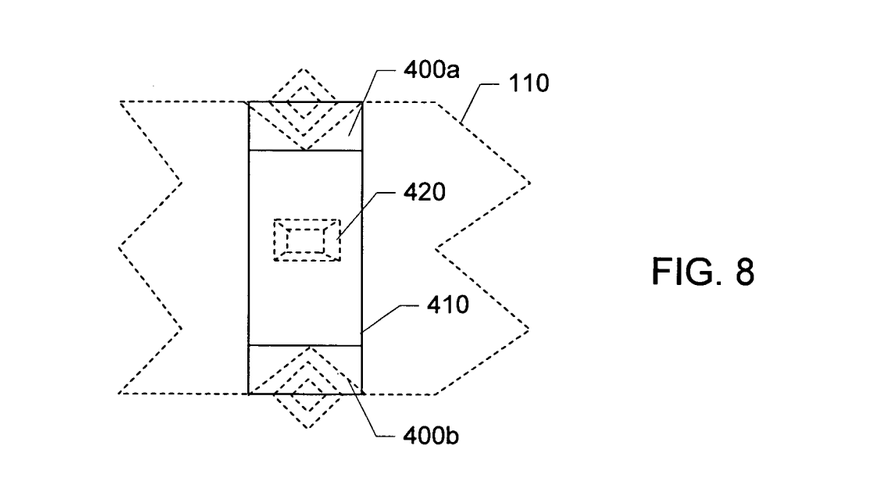
FIG. 8 is a top-view of an exemplary hinge structure of a micro-mirror in accordance with an embodiment of the invention.
Figure 9:
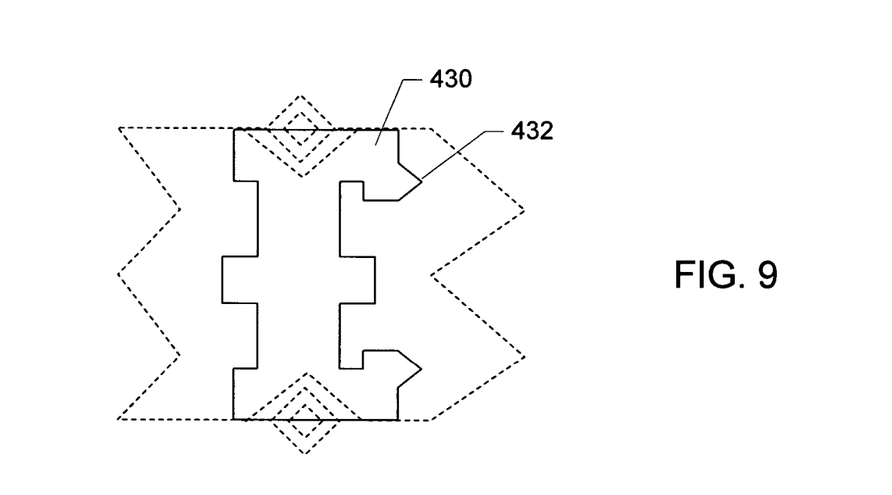
FIG. 9 is a top-view of an exemplary hinge structure of a micro-mirror in accordance with another embodiment of the invention.

The hinge structure can have various designs, such as those shown in FIGS. 8 and 9. Referring to FIG. 8, the hinge structure comprises posts 400a and 400b and shallow via 420. Mirror plate 110 is attached to the shallow via of the hinge structure from the beneath of the hinge structure. Alternatively, the hinge structure can have tips 432 on the posts as shown in FIG. 9. The tips may be used to limit the rotation of mirror plate 110.

Figure 10:
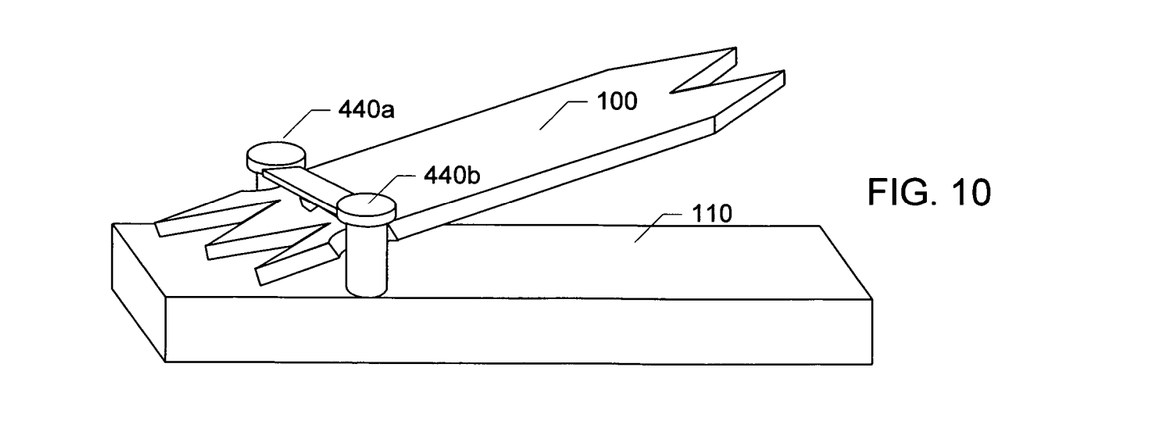
FIG. 10 is schematically demonstrates a micro-mirror with a hinge structure built on a substrate.

The hinge structure and the mirror plate can be formed on a substrate as shown in FIG. 10. According to an embodiment of the invention, substrate 110 is a light transmissive substrate such as quartz or glass. Two posts 440a and 440b of the hinge structure are formed on the substrate. And mirror plate 100 is attached to the hinge structure. In this configuration, the incident light travels through the glass substrate and shines on the surface of mirror plate 100. Alternatively, the substrate can be a standard silicon wafer with electronic circuitry and electrodes formed thereon (in which case the hinge is deposited between the mirror and the substrate (not shown). In this configuration, incident light travels from the "top" of the micro-mirror and is incident on the surface that is opposite to the surface facing the substrate. The electrodes and circuitry on the substrate are provided for deflecting the mirror plates on the substrate.

The hinge structures described above can formed in a variety of ways. An exemplary process for forming the hinge structure in FIG. 4 will be discussed in below with reference to FIGS. 11a to 11g. Another exemplary process for forming the hinge structure in FIG. 5 will be discussed thereafter with reference to FIGS. 12a to 12d.

Figure 11A:
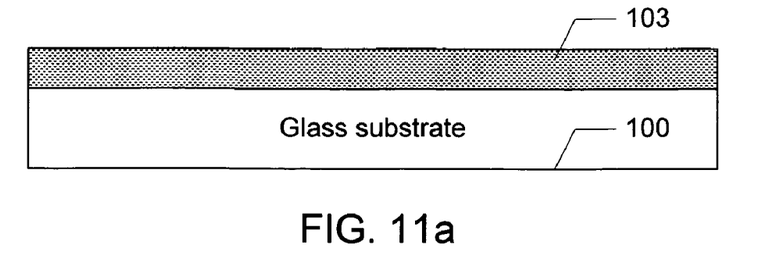
FIGS. 11a to 11g are diagrams demonstrate an exemplary process for building the hinge structure in FIG. 4.

Referring to FIG. 11a, a glass substrate 100 such as Corning 1737F or Eagle 2000, quartz, Pyrex™, sapphire, etc. is provided. A first sacrificial layer 103, such as amorphous silicon is then deposited on substrate 100. The sacrificial layer can be another suitable material that can be removed from under the micro-mirror structure. The thickness of the first sacrificial layer can be wide ranging depending upon the movable micro-mirror size and desired rotation angle, though a thickness of from 500 Å to 50,000 Å, preferably around 7000 Å is preferred. Alternative to amorphous silicon, the first sacrificial layer could be any of a number of polymers, photoresist or other organic material (or even polysilicon, silicon nitride, silicon dioxide depending upon the materials selected to be resistant to etchant, and the etchant selected).

Figure 11B:
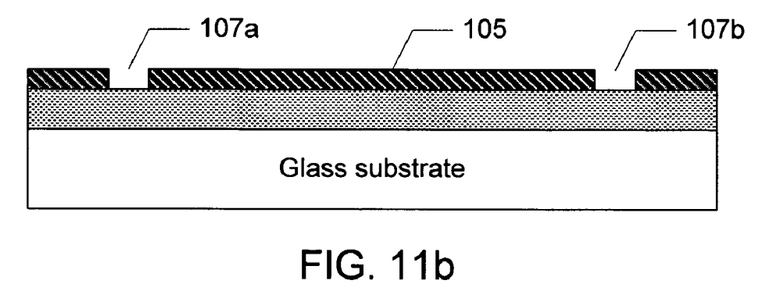
Figure 11C:
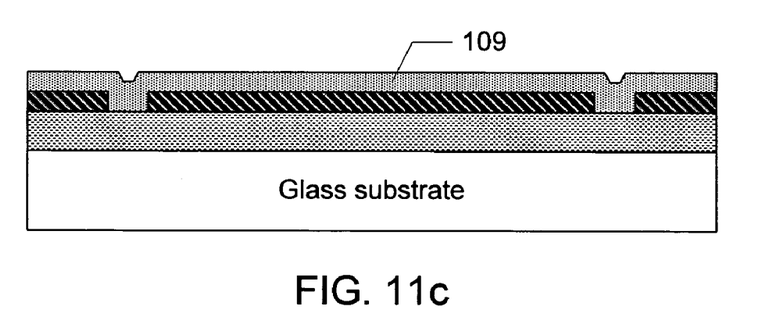

After deposition of the first sacrificial layer, mirror plate layer 105 is deposited and patterned as shown in FIG. 11b. The mirror plate can be metallic materials or metallic alloys that have high reflectivity to visible light. Examples of the mirror plate are $AlSi_xCu_y$, $AlSi_x$, Ag, Al or other suitable materials. The thickness of the first sacrificial layer can be wide ranging depending upon the movable micro-mirror size and desired rotation angle, though a thickness of from 2000 Å to 3000 Å is preferred. The deposited mirror plate layer is then patterned, resulting trenches 107a and 107b. In order to form the hinge structure and the mirror plate on separate layers as shown in 4, a second sacrificial layer 109 is deposited before forming the hinge layer, as shown in FIG. 11c. Second sacrificial layer 109 is not required to be the same as the first sacrificial layer, though preferred. After depositing the second sacrificial layer, multiple layers of the hinge structure are then sequentially constructed, which are shown in FIGS. 11d to 11f.

Figure 11D:
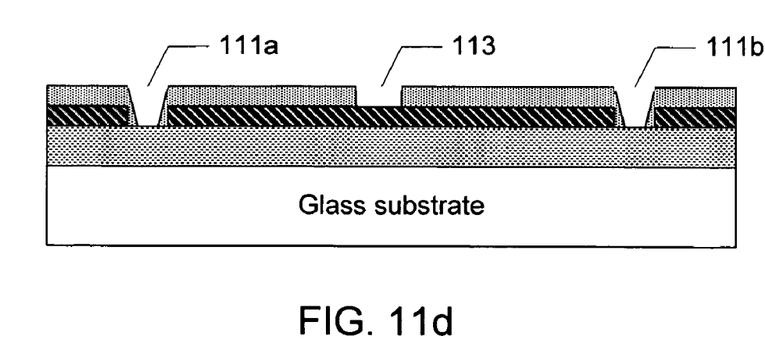
Figure 11E:
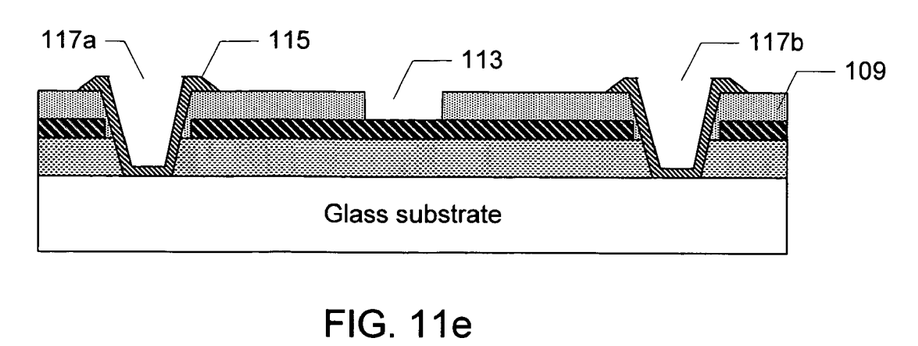

Referring to FIG. 11d, the second sacrificial layer is patterned according to the structure of the hinge structure. On the patterned second sacrificial layer, $SiN_x$ layer 115 is deposited and patterned as shown in FIG. 11e. Hinge layer 119 and a second $SiN_x$ layer 211 are deposited thereafter.

Figure 11F:
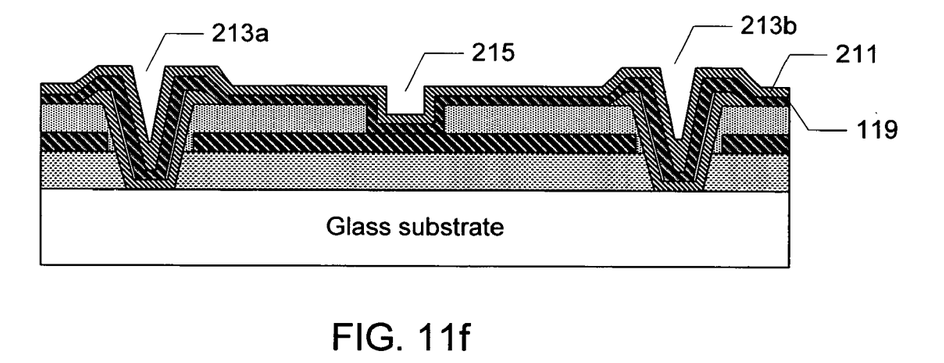

The hinge layer 119 is a conductive layer and makes a conductive contact with the mirror plate in the shallow via 215 as shown in FIG. 11f.

Figure 11G:
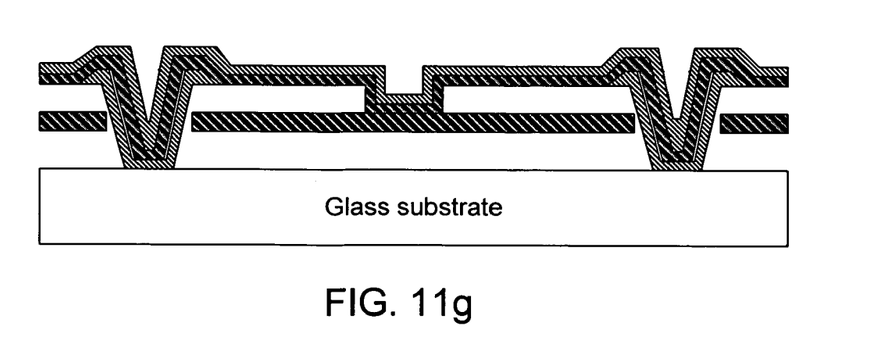

Finally, in order to release the mirror plate for rotating relative to the substrate by the hinge structure, the first and second sacrificial layers are removed by etching using for example, $XeF_2$. FIG. 11g illustrates the released micro-mirror.

Figure 12A:
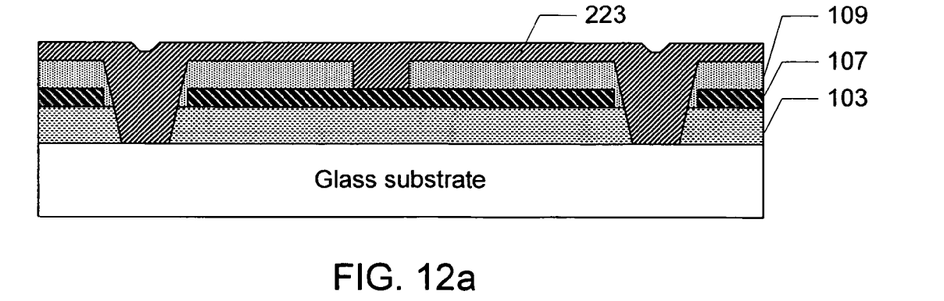
FIGS. 12a to 12d are diagrams demonstrating an exemplary process for building the hinge structure in FIG. 5.
Figure 12B:
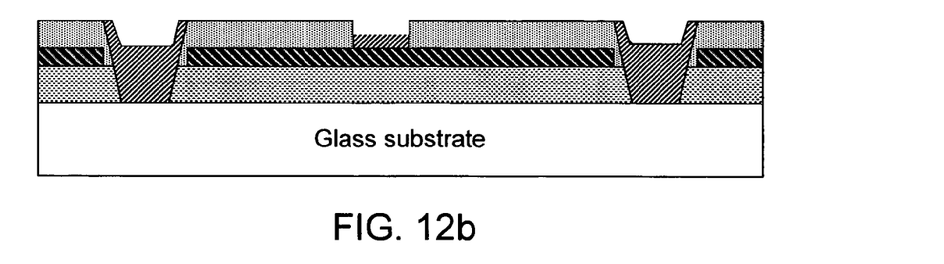
Figure 12C:
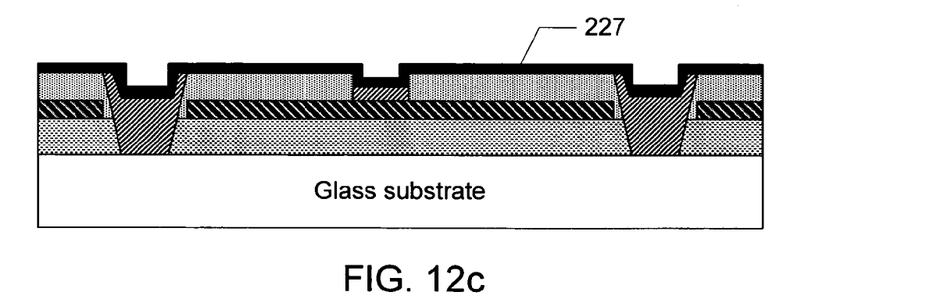
Figure 12D:
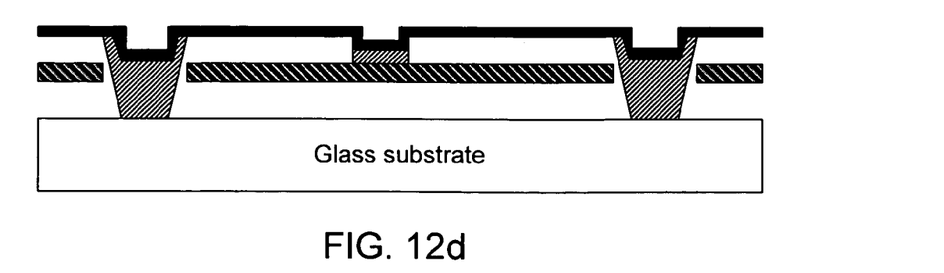

As another example, FIGS. 12a to 12d illustrate the process for constructing the hinge structure in FIG. 5. Referring to FIG. 12a, first sacrificial layer 103 is deposited on the provided substrate 100, followed by depositing and patterning mirror plate layer 107. Second sacrificial layer 109 is deposited and patterned thereafter. On the patterned second sacrificial layer, layer 223 is further deposited. Layer 223 can be $SiN_x$ or other low tensile materials. Layer 223 is then patterned as shown in FIG. 12b followed by depositing hinge layer 227 as shown in FIG. 12c. Finally, the first and second sacrificial layers are removed by etching using for example, $XeF_2$ for releasing the micro-mirror as shown in FIG. 12d.

It should be stressed that the various materials, structures and methods set forth above are exemplary only and many variations are within the scope of the invention. For example, the sacrificial layers, if silicon, could also be removed by other spontaneous chemical vapor phase etchants, such as other noble gas halides or interhalogens (bromine trifluoride, bromine trichloride, etc.). Or the sacrificial layer could be an organic layer, such as a polymer (e.g. polyimide sacrificial) that is released in a downstream oxygen plasma. The shape of the micro-mirror such as illustrated in FIGS. 8–10 having jagged edges could be changed, such as to a square, rectangle, rhombus, trapezoid or V-shaped mirror. Four-sided mirrors with an axis of rotation not along the mirror diagonal are also possible in accordance with the present invention. Also, other materials could be used in the invention, whether fab compatible or not, such as known in the art for making microsystems-type devices. Further, though the embodiment illustrated is for micro-mirrors formed on a light transmissive substrate, such as glass or quartz, it is also possible to form the micro-mirrors on a semiconductor (e.g. Si, SOI, or GaAs) substrate with the hinge of each micro-mirror formed adjacent to the micro-mirror (e.g. in the same plane as the micro-mirror) or between the micro-mirror plate and the substrate. Persons familiar with the field will appreciate that many other variations exist in light of the embodiments described herein.

We claim:

1. A projection system comprising:
    a light source;
    a spatial light modulator comprising an array of micro-mirrors;
    condensing optics, wherein light from the light source is focused as a cone of light with an axis onto the array of micro-mirrors;
    projection optics for projecting light selectively reflected from the array of micro-mirrors;
    a controller for selectively actuating micro-mirrors in the array of micro-mirrors;
    wherein the array of micro-mirrors comprises a substrate and a plurality of mirror plates disposed in a first state in a plane parallel to the substrate, each mirror plate held on the substrate by a hinge structure that comprises a hinge that is spaced apart from the mirror plate so as to define a gap between the hinge and the mirror plate, wherein the hinge structure and mirror plate are constructed so as to be capable of being actuated from the first state to a second state that is at least 14° (fourteen degrees) from the first state, and wherein the first axis of the cone of light incident on the micro-mirrors is at an angle relative to a line perpendicular to the plane parallel to the substrate of at least 28 (twenty eight) degrees.

2. The projection system of claim 1, wherein the second state of the micro-mirror plate is about 16° degrees or more from the first state.

3. The projection system of claim 1, wherein the second state of the micro-mirror plate is 17.5° degrees or more from the first state.

4. The projection system of claim 1, wherein the first state is a state when the mirror plate is parallel to the substrate.

5. The projection system of claim 1, further comprising:
a set of electrodes and circuitry formed on the substrate for controlling the micro-mirror.

6. The projection system of claim 5, wherein the hinge structure further comprises one or more posts formed on the substrate that rotatably hold the mirror plate via the hinge.

7. The projection system of claim 5, wherein the hinge structure further includes:
first and second posts standing on the substrate; and
the hinge attached to the first and second posts.

8. The projection system of claim 5, further comprising a torsion hinge for rotatably connecting the mirror plate to the substrate.

9. The projection system of claim 8, wherein the torsion hinge is disposed on a side of the mirror plate opposite to that of the substrate and defining a gap between the torsion hinge and the mirror plate.

10. The projection system of claim 9, wherein the substrate is a light transmissive substrate.

11. The projection system of claim 8, wherein the hinge comprises a conductive ceramic layer.

12. The projection system of claim 11, wherein the ceramic layer comprises a nitride or oxide of a metalloid or early transition metal.

13. The projection system of claim 11, wherein the hinge further comprises an electrically conductive layer formed on the ceramic layer.

14. The projection system of claim 13, wherein the electrically conductive layer comprises a conductive ceramic, elemental metal, intermetallic compound or metal alloy.

15. The projection system of claim 5, wherein the mirror plate is a substantially four-sided plate with an axis of rotation off-set from a diagonal of the plate.

16. The projection system of claim 5, wherein the torsion hinge is disposed between the mirror plate and the substrate, which is a semiconductor substrate.

17. The projection system of claim 5, wherein the first axis of the cone of light incident on the micro-mirrors is at an angle relative to a line perpendicular to the plane parallel to the substrate of at least 30 (thirty) degrees.

18. A spatial light modulator for use in a projection system, comprising:
an array of micro-mirrors, each micro-mirror comprising:
a substrate;
a mirror plate formed on the substrate, the mirror plate having a non-deflected resting state, the mirror plate held on the substrate by a hinge structure that comprises a hinge that is spaced apart from the mirror plate so as to define a gap between the hinge and the mirror plate; and
wherein the mirror plate operates in a binary-mode that includes an ON-state and OFF-state, the ON-state being at least 14° (fourteen degrees) from the non-deflected resting state.

19. The spatial light modulator of claim 18, wherein the OFF-state is the non-deflected resting state.

20. The spatial light modulator of claim 19, wherein the ON-state is from 15° (fifteen degrees) to 27° (twenty seven degrees) from the non-deflected resting state.

21. The spatial light modulator of claim 19, wherein the ON-state of the mirror plate turns a pixel of an image on, and the OFF-state of the mirror plate turns the pixel off.

22. The spatial light modulator of claim 21, wherein the OFF state is not the non-deflected resting state.

23. The spatial light modulator of claim 19, wherein the substrate is a substrate transmissive to visible light.

24. The spatial light modulator of claim 18, wherein the hinge structure further includes:
a first and second posts; and
a hinge attached to the first and second posts and the mirror plate, with the hinge disposed in a different plane than the mirror plate, such that the mirror plate can rotate relative to the substrate by the hinge.

25. The spatial light modulator of claim 24, further comprising:
a set of electrodes and circuitry formed on the substrate for controlling the micro-mirror, the substrate being a silicon substrate.

26. A projection system comprising:
a light source;
a spatial light modulator comprising:
a substrate; an array of micro-mirrors comprising an array of mirror plates connected to the substrate via a hinge, wherein the size of the mirror plates is less than 20 microns; and
wherein the mirror plates operate in a binary-mode including an ON state and an OFF state, the ON-state being at least 14° (fourteen degrees) from a non-deflected resting state of the mirror plates;
a condensing optics, whereby the light from the light source is focused as a cone of light with an axis onto the array of micro-mirrors; and
a projection optics for projecting light selectively reflected from the array of mirror plates.

27. The projection system of claim 26, further comprising:
a controller for selectively actuating the mirror plates;
wherein the array of mirror plates are operable to be in a first state in a plane parallel to the substrate;
wherein each mirror plate is held on the substrate by a hinge structure that comprises the hinge that is spaced apart from the mirror plate so as to define a gap between the hinge and the mirror plate; and
wherein the first axis of the cone of light incident on the micro-mirrors is at an angle relative to a line perpendicular to the plane parallel to the substrate of at least 28° (twenty eight) degrees.

28. The projection system of claim 27, wherein the first state is a state when the mirror plate is parallel to the substrate.

29. The projection system of claim 27, further comprising:
a set of electrodes and circuitry formed on the substrate for controlling the micro-mirror.

30. The projection system of claim 29, wherein the hinge structure further comprises one or more posts formed on the substrate that rotatably hold the mirror plate via the hinge.

31. The projection system of claim 30, wherein the hinge structure further includes:
   first and second posts standing on the substrate; and
   the hinge attached to the first and second posts.

32. The projection system of claim 31, further comprising a torsion hinge for rotatably connecting the mirror plate to the substrate.

33. The projection system of claim 32, wherein the hinge comprises a conductive ceramic layer.

34. The projection system of claim 33, wherein the ceramic layer comprises a nitride or oxide of a metalloid or early transition metal.

35. The projection system of claim 33, wherein the hinge further comprises an electrically conductive layer formed on the ceramic layer.

36. The projection system of claim 35, wherein the electrically conductive layer comprises a conductive ceramic, elemental metal, intermetallic compound or metal alloy.

37. The projection system of claim 29, wherein the first axis of the cone of light incident on the micro-mirrors is at an angle relative to a line perpendicular to the plane parallel to the substrate of at least 30 (thirty) degrees.

* * * * *